US010033457B2

(12) United States Patent
Sanchez-Valenzuela et al.

(10) Patent No.: US 10,033,457 B2
(45) Date of Patent: Jul. 24, 2018

(54) BLIND SPOT DETERMINATION

(71) Applicant: Buddi Limited, Aylesbury (GB)

(72) Inventors: Jose Antonio Sanchez-Valenzuela, Aylesbury (GB); Zsolt Gaspar, Buckinghamshire (GB); Louise Harrold, Buckinghamshire (GB); Dzmitry Maskou, Buckinghamshire (GB); Sara Murray, Buckinghamshire (GB)

(*) Notice: Subject to any disclaimer, the term of this patent is extended or adjusted under 35 U.S.C. 154(b) by 0 days.

(21) Appl. No.: 14/161,507

(22) Filed: Jan. 22, 2014

(65) Prior Publication Data
US 2014/0206293 A1 Jul. 24, 2014

(30) Foreign Application Priority Data

Jan. 22, 2013 (GB) .................................. 1301112.7

(51) Int. Cl.
*H04B 7/26* (2006.01)
*G08B 21/22* (2006.01)
*G08B 29/18* (2006.01)
*G01S 19/16* (2010.01)
*G08B 21/02* (2006.01)

(52) U.S. Cl.
CPC ............... *H04B 7/26* (2013.01); *G08B 21/22* (2013.01); *G08B 29/185* (2013.01); *G01S 19/16* (2013.01); *G08B 21/0216* (2013.01); *G08B 21/0261* (2013.01)

(58) Field of Classification Search
CPC .............................. H04B 7/26; G08B 21/0216

USPC ....................................................... 455/67.11
See application file for complete search history.

(56) References Cited

U.S. PATENT DOCUMENTS

| | | | | |
|---|---|---|---|---|
| 6,002,334 A * | 12/1999 | Dvorak | .................. | G08B 21/02 340/539.1 |
| 2005/0068169 A1* | 3/2005 | Copley | .............. | G08B 21/0283 340/539.13 |
| 2007/0078976 A1* | 4/2007 | Taylor | ................ | G03G 15/5075 709/224 |
| 2012/0003952 A1* | 1/2012 | Gabriel | .................. | H04M 11/04 455/404.1 |
| 2012/0235860 A1* | 9/2012 | Ghazarian | ............... | G01S 19/16 342/357.4 |
| 2013/0260740 A1* | 10/2013 | Rayavarapu | ........ | H04W 76/046 455/422.1 |
| 2013/0328678 A1* | 12/2013 | Shechter | ............ | G08B 21/0236 340/539.13 |
| 2014/0179342 A1* | 6/2014 | Hamerly | ............... | H04W 4/025 455/456.1 |

\* cited by examiner

Primary Examiner — David Bilodeau
(74) Attorney, Agent, or Firm — Lowe Graham Jones PLLC

(57) ABSTRACT

A method comprising maintaining (A, B), by a device (6), communication with a monitoring unit (7); determining, by the device, an absence of communication from the monitoring unit; based at least on a result of said determining, starting monitoring (F) of at least one variable related to distance moved by the device and/or time elapsed; if the at least one variable meets at least one criterion, determining that the absence of communication from the monitoring unit is not due to a blind spot. A device securely attachable to a person (5) may be configured to carry out this method, which may be user in offender monitoring.

16 Claims, 3 Drawing Sheets

BLIND SPOT DETERMINATION

FIELD OF THE INVENTION

The invention relates to a method including determining that absence of communication is not due to a blind spot. The invention also relates to apparatus for determining that absence of communication is not due to a blind spot.

BACKGROUND

It is desirable to monitor location of certain people. Electronic monitoring is a tool for courts, penal institutions and hospital facilities, for example, to manage persons within their facilities and externally. Electronic monitoring may be used with offenders in pre-trial and post-release management of the person monitored. Use of electronic monitoring instead of imprisonment reduces prison population and provides a convenient way of verifying that the offender obeys conditions of release.

Often an offender will have a home detention curfew imposed requiring the offender to stay within his or her place of residence during specific hours. For example, the offender may be required to remain within their place of residence from 6 pm to 7 am each day. Non-compliance with this requirement is a breach of curfew. Where curfew is breached, the offender may be summoned to court, whereupon more severe punishments may be imposed.

A monitoring system is required to monitor compliance with home detention curfews. Such a system may comprise the tracking device, a residence monitoring unit (RMU) and a remote monitoring platform. The tracking device securely attaches to the offender, usually around the offender's ankle, but in some instances the tracking device may be worn around the waist or wrist. The tracking device is designed to prevent removal by the offender. The monitoring system is configured so that any removal or serious attempt at removal of the tracking device is detected. The removal or serious attempt at removal is considered as a breach of curfew.

The RMU is installed in the offender's place of residence. The tracking device contains radio technology allowing communication with the RMU, so that it can be determined whether the tracking device is within a predetermined range of the RMU, which defines the area over which the offender can move. To maintain communication with the RMU, the tracking device polls the RMU and the RMU listens for polls. Through this polling, the RMU is able to detect whether or not the tracking device is within range since, if polls are not received, the offender is considered to have left his or her place of residence.

The RMU is configured to report data on the polling to the remote monitoring platform. The remote monitoring platform is a computer system that is configured to receive the polling data from the RMU. The polling data is accessible by enforcement persons. The monitoring platform may be configured to perform analytics upon the polling data so that information available to the enforcement persons is more useful. The particular analytics performed depends upon the purpose and functionality of the remote monitoring platform. For example, a simple remote monitoring platform may notify enforcement persons of non-compliance with a home detention curfew in real-time. A more sophisticated system may also store all compliance and non-compliance data and automatically generate detailed reports based on the data.

It is to be noted, that installation and de-installation of the RMU and the tracking device is expensive, not only due to the cost of the RMU and a tracking device but also due to labour costs. Lengthy periods may be required to be spent in offender's homes, which may, on some occasions, be hazardous.

Generally, leaving aside installation and de-installation, electronic monitoring systems are configured to automatically monitor offenders and the only manual intervention required is to investigate non-compliance with terms of the monitoring. Typically, investigating a non-compliant event involves a representative from a monitoring organisation (typically referred to as a "Field Officer" (FO)) visiting the offender's home. The FO may find that the offender has absconded, in which case the police are notified so that the offender can be tracked down, which is clearly a laborious and expensive process. The FO may find that the offender is still within their home. This may be due to the offender having left home briefly and returned. It may alternatively be due to a breakdown of the communication between the tracking device and the RMU. In this case, it may instead be due to a blind spot.

Blind spot may arise due to uneven distribution of RF signal from RMU, such that in some areas the signal is weaker than expected. Thus, the offender may be located within their home when no RF link is possible between the RMU and the tracking device. Also, blind spots exist where the polling signal produced by the tracking device is not received by the RMU.

The uneven signal distribution is caused by several factors present within all homes. These factors include the existence of interior walls, electrical equipment, furniture and metallic objects. For example, blind spots may be caused inside buildings by multiple RF beams bounced off walls. In some cases, these beams combined their energy and boost the signal in a particular place in the building; in other cases the opposite occurs and blind spots are formed in the building where the signal is too weak for detection.

One possible way to attempt to reduce blind spots is for the RMY and preferably also the tracking device to produce a more powerful radio signal. A more powerful radio signal reduces the number of blind spots within a home and may reduce the size of others; however it is unlikely to completely eliminate them. Furthermore, the main purpose of the electronic monitoring system is to detect movement of the offender out of the area of his or her home, where the area of the home is defined by the range to which the offender can move with the RMU and the tracking device maintaining a link. If the power of the radio signal is increased, the area over which the offender can move is increased, potentially thereby not restricting the offender to their home, but to a wider area. For example, for some residences, the power may need to be increased to such a level that it is possible for the offender to be 500 meters or more from their place of residence without a breach of curfew being detected and reported, in order for the number of blind spots and their size to be usefully reduced.

Another possible way to reduce the problem of blind spots is to use more than one RMU in the offender's at home. This greatly reduces the likelihood of blind spots existing and allows the range of the RF signal to be more accurately controlled without the power of an RMU antenna being significantly increased. There are however various disadvantages to using multiple RMUs. Costs relating to the RMUs are multiplied. Use of multiple RMUs does not guarantee that blind spots will be eliminated. Different numbers of RMUs are required for different sizes and/or layouts of homes. Installation is more laborious. The consistency of the RF signal through the home has to be verified by a trained technician, adding time and cost to the installation process and also introducing greater possibility for human error. Where the RMUs communicate to the remote monitoring platform over radio telephone landline, their location in a home is limited to areas in which telephone jack points are located. Further, many homes do not have a sufficient number of suitable telephone jack points. This may be particularly problematic as it is recommended that RMUs are installed away from certain appliances, such as televisions, microwaves, sources of moisture, direct sunlight, washing machines, radiators and places where they may be vulnerable to being knocked.

Another possible way to reduce or eliminate blind spots is to use multiple antennas separated in space within a single RMU, using so-called multiple input multiple output (MIMO) technology. Such technology is widely used to mitigate the effects of RF interference. MIMO systems advantageously reduced occurrence of blind spots. However, use of such technology significantly increases the size of the RMU as well as its cost, without guaranteeing elimination of blind spots.

It is an object of the present invention to mitigate the effects of blind spots, without any of the drawbacks mentioned above.

SUMMARY OF THE INVENTION

According to a first aspect of the present invention, there is provided a method comprising: maintaining, by a device, communication with a monitoring unit; determining, by the device, an absence of communication from the monitoring unit; based at least on a result of said determining, starting monitoring of at least one variable indicative of distance moved by the device and/or time elapsed; if the at least one variable meets at least one criterion, determining that the absence of communication from the monitoring unit is not due to a blind spot.

Thus, blind spots can be automatically detected and false alerts resulting from them can be cancelled automatically, without need for human intervention. This saves on labour and cost, especially where conventionally the false alert would have resulted in a visit from a field officer or the police.

According to a second aspect of the present invention, there is provided apparatus for determining that absence of communication is not due to a blind spot, comprising: a device comprising a processor and a memory having computer program code stored thereon, wherein the processor, together with the memory and the code, are configured to: maintain communication with a monitoring unit; determine an absence of communication from the monitoring unit; based at least on a result of said determining, start monitoring of at least one variable indicative of distance moved by the device and/or time elapsed; and if the at least one variable meets at least one criterion, determine that the absence of communication from the monitoring unit is not due to a blind spot.

BRIEF DESCRIPTION OF THE FIGURES

For better understanding of the present invention, embodiments will now be described, by way of example only, in which.

DETAILED DESCRIPTION OF EMBODIMENTS

Figure 1:
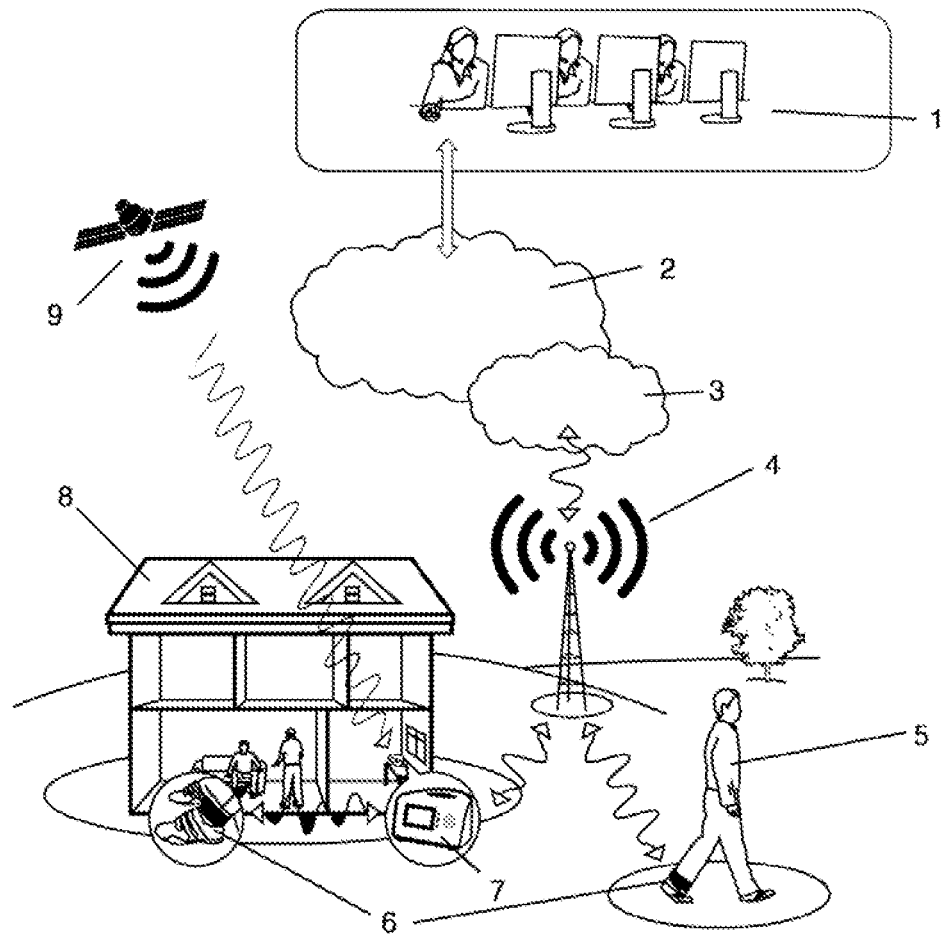
FIG. 1 an illustrative diagram of elements of an electronic monitoring system in accordance with an embodiment, and the environment in which such a system may be used.

Referring to FIG. 1, in an embodiment an electronic monitoring system for offender tracking comprises a monitoring platform 2, a residence monitoring unit (RMU) 7, and a tracking device wearable by an offender 5. The monitoring platform 2 is cloud-based and accessible by authorised persons at terminals at a monitoring centre 1. The tracking device includes a personal identification device (PID) 6.

The RMU 7 is fixedly located in the place of residence/home 8 of the offender 5. The offender 5 is an individual whose movements are restricted in accordance with home detention conditions, which specify either that the offender must remain within the area of his home during one or more predetermined period or for the duration of the monitoring.

The RMU 7 is configured for communication with the PID 6 and includes a transceiver (not shown) to this end. The range of the communication between the RMU 7 and the PID 6 is intended to define the area over which the offender may move without breach of the home detention conditions.

The RMU 7 is also configured for communication with the monitoring platform 2 via a mobile communications network 4 and a gateway 3 and the transceiver apparatus is configured for communication with the networks 4. It will be appreciated that while FIG. 1 illustrates only a single offender 5, RMU 7 and home 8, the monitoring platform 2 is configured to communicate with a plurality of RMUs, which provide data on the whereabouts of a corresponding plurality of offenders. The gateway 3 is configured to receive and collect data from the RMUs and is preferably configured to standardise the form of the data before providing it to the monitoring platform 2, such that upstream software and/or hardware, that is of the monitoring platform, or downstream software and/or hardware, that is of the RMUs can be changed.

The RMU 7 includes a further transceiver (not shown) for transmitting data to and receiving data from the gateway 3, and thus the monitoring platform 2, via the mobile communications network 4 using a wireless protocol. The network 4 may be a GSM or UMTS network and the data transmitted and received via one or more base stations. The network 4 may alternatively be another kind of mobile communications network. Embodiments of the invention are not limited to any particular means of communication between the gateway 3 and the RMU 7. In alternative embodiments, the RMU 7 and the gateway 3 may communicate over a landline network, or via another kind of wireless network such a metropolitan area network, or via the internet.

Communication between the gateway 3 and the RMU 7 may also take place through more than one network, for example through a mobile communications network and the internet.

The PID 6 is part of the tracking device that is securely attachable to an ankle of an offender 5, for example with a locking strap that is only releasable by a field officer. Alternatively, the PID 6 may be attached to another part of the offender's body, for example to a wrist or waist.

Figure 2:
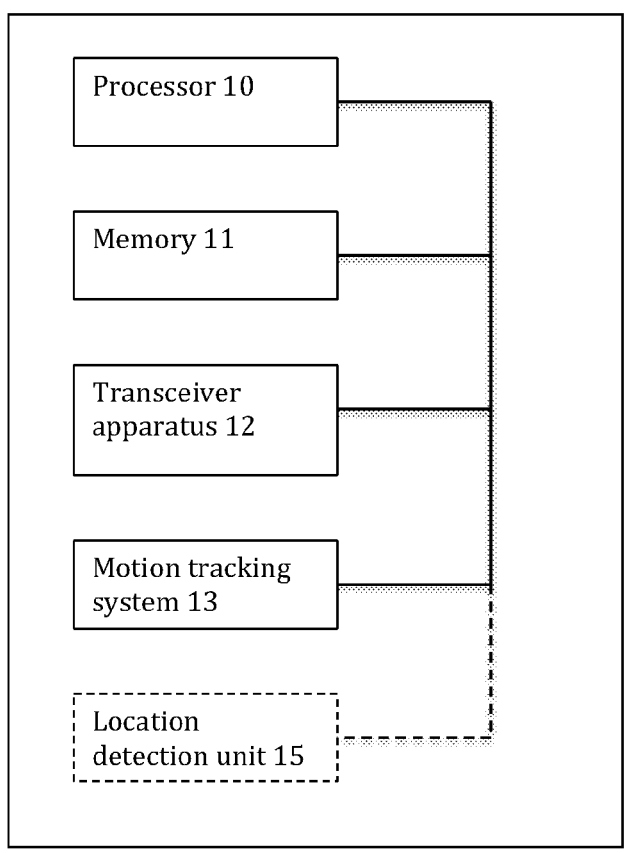
FIG. 2 is a diagram indicating some components in a tracking device.

Referring to FIG. 2, the PID 6 includes a processor 10, a memory 11, transceiver apparatus 12 and a motion tracking system 13, for example in the form of an accelerometer, all connected to a bus 14. The memory 11 has a computer program comprising code stored thereon, which, when run by the processor 10, permits the PID 6 to provide the functionality described herein. The transceiver apparatus 12 is configured to communicate with the RMU 7 using a first RF technology and also the monitoring platform using a second RF technology.

The motion tracking system may comprise an accelerometer, from which information on distance and direction moved by the PID 6 and thus the offender 5 can be derived. In variant embodiments, alternative means of determined direction moved by the PID 6 may be used. Optionally the motion tracking system is activated, information on distance travelled and direction is also preferably collected so that location of the offender, where he or she has absconded, can be estimated. Where the motion tracking system comprises an accelerometer, the accelerator may also be used in tamper detection applications.

The PID 6 is programmed so that a set of parameters stored in memory 11 specific to the home detention conditions imposed upon the offender 5. This set of parameters is known as the "compliance rules". A first compliance rule is defined with values indicative of the times over which an offender must remain in the home area for compliance with the home detention conditions. The first compliance rule is met for a given time if the offender must be within his or her home area for compliance with the home detention conditions. For example, the home detention conditions may require that the offender not leave his or her home area during a defined period each day, such as from 6 pm to 7 am. The first compliance rule is met for a given time if that time is between 6 pm and 7 am. Alternatively, the home detention conditions may require that the offender not leave his or her home at any time for the duration of the monitoring, an end date of which may be specified. In this case, the first compliance rule is always met.

A second compliance rule is defined with values indicative of:
a) a time period over which distance moved by the offender is monitored when communication between the PID 6 and the RMU 7 is determined to be lost; and
b) a threshold distance over which the offender may move over said time period without the PID 6 determining that the home detention conditions have been breached.

The second compliance rule requires that the PID 6 and thus the offender 5 not move more that the threshold distance within the specified time period.

The values for the first and second compliance rules are provided to the PID 6, preferably remotely by a person at the monitoring centre 1 using the monitoring platform 2 and via the RMU 7. The value for the first compliance rule at least can preferably be changed remotely, such that the home detention conditions can be changed remotely.

The computer program code includes a motion sensing algorithm. This enables the PID 6 to use data determined by the motion tracking system to generate data indicative of the distance travelled by offender when the PID 6 over a time period.

The monitoring platform 2 is a software system usable by persons at terminals at the monitoring centre 1. The monitoring platform 2 is configured to receive data from RMUs via the gateway 3. Persons at the monitoring centre 1 may make decisions based upon the data reported by the monitoring platform 2 and coordinate activities of field officers. The monitoring platform 2 has information on the home detention conditions for each offender that is being monitored. The monitoring platform is configured to analyse the data received from the RMUs and to generate an alert when it appears that an offender has breached home detention conditions.

The PID 6 is configured to poll the RMU 7 periodically and to determine an alert condition if the RMU 7 does not respond to one or more polls. Non-response to a poll may be indicative of the offender 5 having left his or her home, such that the PID 6 is beyond the range of the RMU 7. However, as mentioned above, the home 8 of the offender 5 likely has blind spots in which communication between the RMU 7 and the PID 6 is not possible. Generation of a false alert when the offender 5 and thus the PID 6 are located in a blind spot is to be avoided Notably, homes of different offenders have different sizes, constructions, layouts and furnishings, all of which impact on number, size and location of blind spots. Typically, blind spots are small in size; for example, where a particular RF frequency is used for communication between the RMU 7 and the PID 6, the mean size of each blind spot maybe about 300 mm in diameter.

Figure 3:
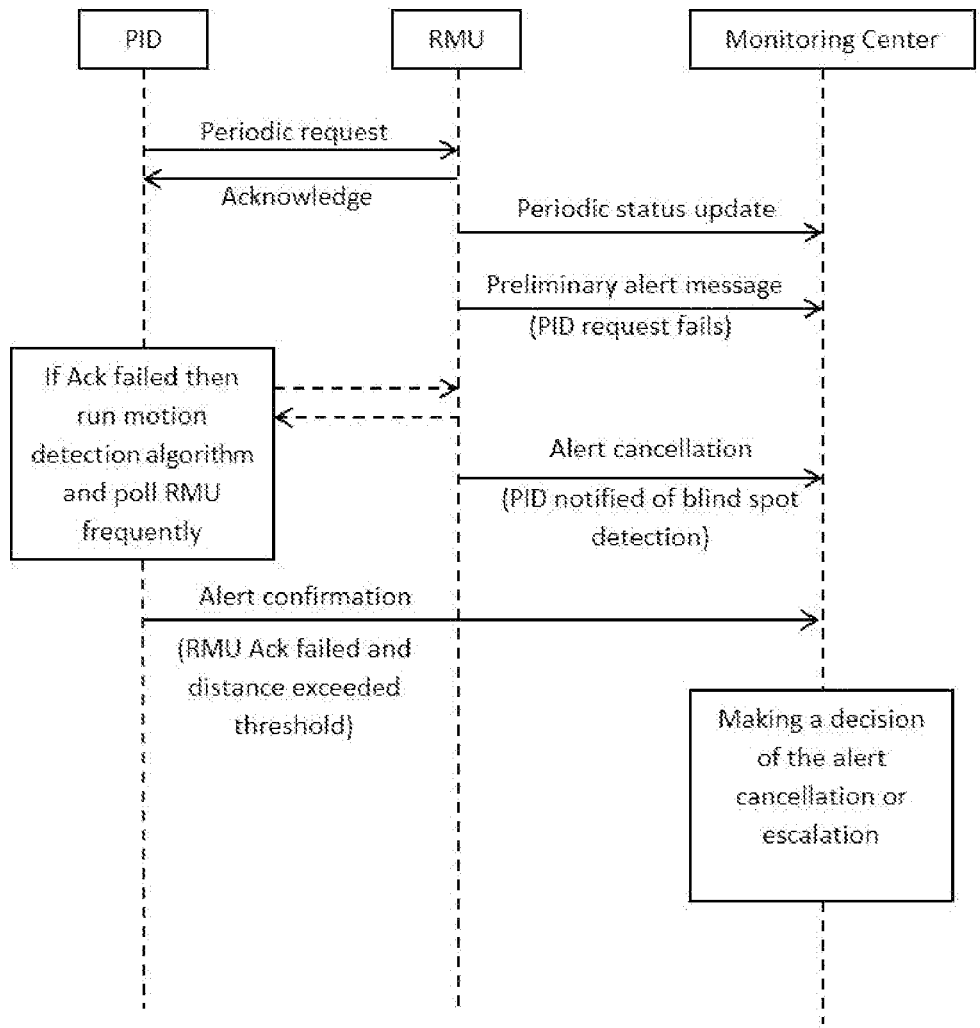
FIG. 3 illustrates messages between elements of the monitoring unit.

Operation of the electronic monitoring system will now be described with reference to FIG. 3. The PID 6 polls the RMU 7, that is, periodically pings a request to the RMU 7 and waits for a reply. One such request is indicated at A in FIG. 3. The mean time between sending of such requests is preferably of the order of thirty seconds, and is intended to be such as to preserve battery life of the PID 6, while being sufficiently frequent for good monitoring of the offender 5. The RMU 7 usually receives the requests and, in response thereto, the RMU 7 transmits a reply B to the PID 6. One such reply is indicated at B The RMU 7 periodically sends a status update C to the monitoring platform 2. Status update indicates that the RMU 7 and the PID 6 are in communication. The status update C may be sent for each request from the PID 6 received by the RMU 7, or alternatively may be sent after a longer time periods, for example after a predetermined time period has expired. Accordingly, there may be a plurality of requests and replies A, B for each status update C sent.

If the RMU 7 does not receive after a predetermined time period has expired a polling from the PID 6, the RMU 7 sends a preliminary alert message D to the monitoring platform 2. The monitoring platform 2 then, in response to a preliminary alert message D, initiates a preliminary alert condition.

If the PID 6 does not receive a reply from the RMU 7, the PID 6 determines that communication between the PID 6 and the RMU 7 is lost. This may be due to a reply transmitted by the RMU 7 not reaching the PID 6, or due to the request transmitted from the PID 6 not reaching the RMU 7 with the consequence that the RMU 7 does not transmit a reply. In either case, the PID 6 does not know whether the loss of communication is due to a result of non-compliance or the offender 5 being located in a blind spot.

The purpose of the next steps is for the PID 6 to determine whether the loss of communication is due to the blind spot. The PID 6 determines whether the present time is at a time over which the home detention conditions require the offender to be in the home area, that is, whether the first compliance rule is met. If the first compliance rule is not met, no further action is taken by the PID 6.

If the loss of communication is within the times of the home detention conditions, that is, the first compliance rule is met, the PID 6 activates the motion tracking system 13 at step F. The PID 6 then monitors the distance over which the offender 5 moves using the accelerometer and know algorithms, and determines whether the second compliance rule is met, that is, the PID 6 determines whether, after the predetermined time period specified in the second compliance rule, the distance moved by the offender 5 is greater than the threshold distance specified in the second compliance rule. If the distance moved is less than the threshold distance, the PID 6 determines that the loss of communication with the RMU 7 is due to the offender 5 being located in a blind spot. The PID 6 then stores in the memory data indicative of the fact that there was a loss of communication with the RMU 7 at a particular time and that it was determined that this was due to a blind spot. The PID 6 later send this data to the RMU 7, which provides it to the monitoring platform 2. Further to the PID 6 determining that first compliance rule is met, the PID 6 also increases the frequency with which it polls the RMU 7. If the RMU 7 receives a polling request E from the PID 6, it sends an alert cancellation message to the monitoring centre 2, on receipt of which the monitoring centre cancels the preliminary alert condition at step J.

Preferably, if communication with the RMU 7 is not re-established within a predetermined time period, the PID 6 sends a message itself including the stored data to the monitoring platform 2 using the second RF technology, on receipt of which the monitoring platform 2 cancels the preliminary alert condition.

If the PID 6 determines that the distance moved by the offender 5 over the time period is greater than the threshold distance, then the PID 6 generate and sends an alert confirmation message I to the monitoring platform 2 using the second RF technology, for example over a mobile communications network such as a GSM or UMTS network. On receipt of the alert confirmation message, the monitoring centre 2 determines at step J to escalate the preliminary alert condition, for example by sending an alert message to a person at the monitoring centre 1 or a field officer.

In a variant embodiment, the distance travelled by the PID 6 after the motion tracking system 13 has been activated is not determined in the PID 6. Instead, information from which the distance can be derived is transmitted using the second RF technology is compressed, encrypted and transmitted to the monitoring platform 2. At the monitoring platform 2, the information is decrypted, decompressed and processed to determine the distance that the PID 6 has travelled over the predetermined time period. This is because algorithms used to determine the distance moved maybe complex and it may be preferable to determine the distance remotely from the PID 6 on a server depending on the battery life requirements of the PID 6 and the complexity of the algorithms.

In this case, if it is determined at the monitoring platform 2 that the distance moved by the offender 5 and thus the PID 6 is less than the threshold distance then the monitoring platform 2 automatically cancels the alert condition, since it can be safely assumed that the offender 5 is still within his or her home 8 and the loss of communication was caused by a blind spot. If the distance moved is greater than the threshold distance, the monitoring platform 2 determines that the alert condition should be escalated.

In variant embodiments, the monitoring platform 2 and/or the PID 6 is configured to automatically adjust the values for the second compliance rules. For example, following a loss of communication, the PID 6 may determine that the distance moved by the offender is greater than the threshold distance, but the monitoring platform 2 then receives information indicating that the alert is a false alert, which may occur when the PID 6 and the RMU 7 re-establish communication after the PID 6 has transmitted an alert confirmation message. In this case, the threshold distance and/or the time period over which distance is measured may be altered. Dependent upon the battery life requirements of the PID 2, the processor 10 may analyse stored data and automatically adjust these parameters. Alternatively, such analysis may take place at the monitoring platform. This is particularly useful for homes that may contain larger than average blind-spots and creates a system that learns and improves its own accuracy after every event.

An example is provided in greater detail in the following. The average blind-spot size within homes is estimated to be circular and 0.3 m diameter. Therefore by default threshold distance can be set with a distance travelled safety threshold of 1 m. The result is that the 0.3 m blind-spot will always be cancelled. However a blind-spot may actually be 0.8 m diameter, significantly larger than the average. With changes in detection accuracy, weather, objects being moved within the home, it may be assumed that there is a risk of that blind-spot increasing in diameter to over the 1 m threshold. In order to combat this an algorithm is used in which, for example, the average actual distance travelled within a blind-spot is calculated and a 50% safety margin is added. Thus in this case the measured size is 0.8, so 0.8×1.5=1.2 m. The threshold will now be set to 1.2 m and is therefore less likely to falsely detect non-compliance with home detention conditions. Similarly the system may learn to reduce the size threshold making the system more accurate. Preferably, a a maximum and minimum threshold distance is set to prevent offenders teaching their system to provide greater freedom. A maximum size of 5 m and minimum of 0.2 m have been established to be sensible initial values for homes in the UK.

Preferably, the PID 6 is configured to disable itself outside of the times over which the curfew order is to be served, thereby to save battery power.

In an embodiment, the RMU 7 optionally includes a unit by which the location of the RMU 7 can be remotely determined. The optional unit is indicated at 15 in FIG. 2. The unit may be in the form of a GPS locator. The GPS locator is capable of receiving signals in accordance with the Global Positioning System (GPS), processing those signals to determine location data indicative of the location of the RMU 7 at a particular time, and providing that location data to the transceiver. The location data includes an indication of the time at which the location is indicated by the location data in the form of a time stamp. In response to receiving such data, the transceiver transmits the location data, or stores or queues it for later sending. The ability to monitor the location of the RMU 7 remotely means that the offender 5 cannot move the RMU 7 in an attempt to change the area in which the RMU 7 and PID 6 can communicate. Also, inclusion of remote location determining technology facilitates self-installation of the RMU 7, that is, installation of the RMU 7 by the offender rather than by a field officer.

Although the RMU 7 includes a GPS locator for determining location data, there are many other ways that the location (or approximate location) of the positioning device might be determined. Embodiments of the invention are not limited to any particular way of generating location data. The positioning device could determine location using another kind of global satellite navigation system (GSNS). Other techniques for determining location could also be used, for example where the RMU 7 is configured for communication with a mobile communications network, analysis of characteristics of signals to and/or from base stations in a surrounding mobile communications network may be performed. The location data does not have to be determined at the device; it could be determined in a wireless communications network, or at a remote server. Methods of determining the location of a device are known in the applicable art.

In the above embodiments, as will be understood by the skilled person, the RMU 7 includes a memory in which computer program code is stored, and a processor, and, when the computer program code is executed by the processor, the RMU 7 performs the functionality described herein. Alternatively, the functionality of the RMU 7, and indeed the PID 6 described above, could be implemented in dedicated processing equipment or a mixture of dedicated hardware and software. The memory of the RMU 7 and the PID 6 may include volatile and non-volatile, removable and non-removable media configured for storage of information, such as RAM, ROM, Erasable Programmable Read Only Memory (EPROM), Electrically Erasable Programmable Read Only Memory (EEPROM), flash memory or other solid state memory, CD-ROM, DVD, or other optical storage, magnetic disk storage, magnetic tape or other magnetic storage devices, or any other medium which can be used to store information which can be accessed. Also, in each of the RMU 7 and the PID 6, the processor may be a single processing unit, or a plurality of connected processing units.

Similarly, the monitoring platform 2 is software that runs on one or more servers. As mentioned above, the monitoring platform 2 may be based in the cloud. Alternatively, the monitoring platform 2 may run on one or more dedicated servers, which may be located in the monitoring centre 1.

In the field of electronic monitoring, embodiments of the invention are not limited to where an offender is monitored, but may include embodiments, in which electronic tracking devices are attached to animals and persons other than offenders. For example, persons with certain mental illnesses may desirably be monitored. Further, there is no reason why tags in accordance with embodiments of the invention cannot be attached to motor vehicles, bicycles, containers, computer equipment and other physical objects.

As will be appreciated by the person skilled in the art, various modifications possible to the embodiments described above.

The applicant hereby discloses in isolation each individual feature and step described herein and any combination of two or more such features or steps, to the extent that such features or steps or combinations are capable of being carried out based on the present specification as a whole in the light of the common general knowledge of a person skilled in the art, irrespective of whether such features or steps or combinations of features or steps solve any problems disclosed herein, and without limitation to the scope of the claims. The applicant indicates that aspects of the present invention may consist of any such individual feature or step or combination of features or steps. In view of the foregoing description it will be evident to a person skilled in the art that various modifications may be made within the scope of the invention.

The invention claimed is:

1. A method comprising:
   maintaining, by a device, communication with a monitoring unit;
   determining, by the device, an absence of communication from the monitoring unit;
   in response to said determining, starting monitoring of at least one variable indicative of distance moved by the device;
   attempting to re-establish communication with the monitoring unit;
   if the communication with the monitoring unit is not re-established, determining, based at least on the at least one variable, if at least one criterion is met, wherein the at least one criterion comprises that the distance moved exceeds a threshold distance, wherein the threshold distance is greater than a diameter of an average blind spot;
   determining by the monitoring unit an absence of communication from the device, and sending a first message to the remote monitoring system indicating such;
   receiving, by the remote monitoring system, the first message and initiating an alert condition based on the first message; and
   if communication is re-established, sending, by the monitoring unit, a second message to the remote monitoring system indicating such.

2. The method of claim 1, wherein the step of determining that the at least one variable satisfies the at least one criterion is performed on the device.

3. The method of claim 1, further comprising sending, by the device, data indicative of the at least one monitored variable to a remote monitoring system, wherein the determining if the at least one criterion is met is performed at the remote monitoring system.

4. The method of claim 1, wherein the maintaining communication with the monitoring unit comprises polling of the monitoring unit by the device, and the attempting to re-establish communication with the monitoring unit comprises the device polling the monitoring unit, wherein the frequency of polling while attempting to re-establish communication is greater than the frequency while maintaining communication.

5. The method of claim 1, further comprising receiving by the monitoring system the second message, and determining based at least on the second message that any alert condition is to be cancelled.

6. The method of claim 1, wherein the at least one criterion comprises that the distance moved by the device exceeds a threshold distance over a predetermined time period.

7. The method of claim 6, further comprising:
   if the distance moved by the device does not exceed the threshold distance, sending, by the device, a message indicating that any alert condition is to be cancelled to the remote monitoring system.

8. The method of claim 7, wherein a third message is sent over a mobile telecommunications network.

9. The method of claim 1, wherein the device is fixedly attached to a person.

10. The method of claim 1, further comprising, after determining, by the device, an absence of communication from the monitoring unit, determining whether the present time is during a time period in which movement of the device is restricted, and, if the present time is in such a time period, proceeding with the monitoring.

11. A system for determining that absence of communication is not due to a blind spot, comprising:
    a remote monitoring unit; and
    a device comprising a processor and a memory having computer program code stored thereon, wherein the processor, together with the memory and the code, are configured to:
       maintain communication with the remote monitoring unit;
       determine an absence of communication from the remote monitoring unit and to receive, from the remote monitoring unit, a first message indicating the absence of communication;

after the determining of an absence of communication from the remote monitoring unit, attempt to re-establish communication with the remote monitoring unit;

in response to said determining, starting monitoring at least one variable indicative of distance moved by the device; and if the communication with the remote monitoring unit is not re-established, determining, based at least on the at least one variable, if at least one criterion indicative of the absence of communication from the remote monitoring unit being not due to a blind spot is met, wherein the at least one criterion comprises that the distance moved exceeds a threshold distance, wherein the threshold distance is greater than a diameter of an average blind spot; and the remote monitoring unit further being configured such that when communication is re-established, the remote monitoring unit sends a second message to a remote monitoring system indicating such.

12. The system of claim 11, wherein the device is configured to maintain communication with the remote monitoring unit by polling of the remote monitoring unit, and wherein the device is configured to poll at a greater frequency while attempting to re-establish communication with the remote monitoring unit.

13. The system of claim 11, wherein the monitoring system is configured to receive the second message, and to determine based at least on the message indicating that communication is re-established that any alert condition is to be cancelled.

14. The system of claim 11, wherein the at least one criterion comprises that the distance moved by the device exceeds the threshold distance over a predetermined time period.

15. The system of claim 11, wherein the device further comprises a motion detection unit configured to monitor distance moved by the device.

16. The system of claim 11, wherein the device is configured to send to the remote monitoring system an alert confirmation message indicating that the absence of communication from the monitoring unit is not due to a blind spot.

* * * * *